United States Patent
Tosaka et al.

[11] Patent Number: 5,825,602
[45] Date of Patent: Oct. 20, 1998

[54] OVERCURRENT TRIP DEVICE

[75] Inventors: Hiroaki Tosaka; Koji Nomura; Katsunori Kuboyama; Tatsunori Takahashi; Fumiyuki Ikeda, all of Saitama, Japan

[73] Assignee: Fuji Electric Co., Ltd., Kawasaki, Japan

[21] Appl. No.: 823,730

[22] Filed: Mar. 25, 1997

[30] Foreign Application Priority Data

Mar. 26, 1996 [JP] Japan ..................... 8-095998

[51] Int. Cl.⁶ ........................................... H02H 3/00
[52] U.S. Cl. ..................... 361/94; 361/98; 361/99; 361/102; 361/187
[58] Field of Search ........................ 361/93, 94, 98, 361/99, 102, 160, 170, 187, 194, 195, 202

[56] References Cited

U.S. PATENT DOCUMENTS

| | | | |
|---|---|---|---|
| 4,442,471 | 4/1984 | Trayer | 361/63 |
| 4,562,506 | 12/1985 | Moran | 361/71 |
| 4,567,540 | 1/1986 | Ruta | 361/93 |
| 5,400,203 | 3/1995 | Tice | 361/62 |
| 5,508,875 | 4/1996 | Innes | 361/93 |
| 5,579,194 | 11/1996 | Mackenzie et al. | 361/24 |
| 5,668,692 | 9/1997 | Rodgers et al. | 361/93 |

*Primary Examiner*—Jeffrey A. Gaffin
*Assistant Examiner*—Michael J. Sherry
*Attorney, Agent, or Firm*—Finnegan, Henderson, Farabow, Garrett & Dunner, L.L.P.

[57] ABSTRACT

An overcurrent trip device includes a capacitor 13 that stores power for driving a trip electromagnet 7, and a charging current generating means 18 that starts charging the capacitor 13 upon detection of an overcurrent and that completes the charging of the capacitor 13 until a trip control circuit 5 outputs a trip signal. The operation of the trip electromagnet 7, which is driven with the charges of the capacitor 13 by causing a thyristor 12 to be turned on by the trip signal, is continued until the charges of the capacitor 13 are lost, and even after the power supply from a rectifying circuit 4 is stopped due to the opening of a circuit breaker 8, it is made impossible to reset and re-close the circuit breaker 8 for a predetermined time.

12 Claims, 3 Drawing Sheets

OVERCURRENT TRIP DEVICE

BACKGROUND OF THE INVENTION

1. Field of the Invention

The present invention relates to overcurrent trip devices that are arranged as overcurrent protecting means for electric circuit while attached to or separately arranged from circuit breakers or electromagnetic contactors.

2. Description of the Related Art

Overcurrent trip devices can be classified into two types according to the power supply mode. A so-called current transformer power supply type is designed to drive an electronic circuit with a secondary output of a current transformer such as one incorporated into a solid-state type circuit breaker. An external power supply type is designed to drive an electronic circuit by externally supplied power such as a solid-state type overcurrent relay.

FIG. 3 is a block diagram showing an overcurrent trip device of the current transformer power supply type incorporated into an electric circuit breaker. In FIG. 3, electronic current flowing through electric circuit 1 of the three phases are detected as current signals by current transformer 2, and the secondary outputs of the current transformer 2 are subjected to a full wave rectifier circuit 3, and the rectified waves are thereafter converted into voltage signals proportional to the current signals by a current-voltage converting circuit 4. A trip control circuit 5 monitors the magnitudes of currents in the electric circuit by receiving the voltage signals from the current-voltage converting circuit 4, and upon judgment of an overcurrent, applies a trip signal to a trigger circuit 6 after a predetermined delay time has elapsed. The trigger circuit 6 that has received the trip signal then drives a trip electromagnet 7, and opens circuit breakers 8 by tripping not shown switch mechanisms. Power to the respective parts 4 to 7 is supplied from a power supply circuit 9, and the power to the power supply circuit 9 is supplied from the rectifying circuit 3.

On the other hand, FIG. 4 is a block diagram showing a solid-state overcurrent relay of the external power supply type. In FIG. 4, while the rectifying circuit 3, the current-voltage converting circuit 4, the trip control circuit 5, the trigger circuit 6, and the like are the same as those of the current transformer power supply type, the trip relay 10 is driven by the trigger circuit 6, and the trip coil of, e.g., a separately arranged shunt trip release device is energized by the output of the trip relay 10 to thereby open the electric circuit 1. Further, the power supply circuit 9 that supplies power to the respective parts 4 to 7 receives power from a not shown external power source through an external input terminal 11.

In the aforementioned conventional devices, the current transformer power supply type is characterized in that power supply for the energizing of the trip electromagnet is stopped when the circuit breaker has been opened. Therefore, immediately after trip operation, the circuit breaker becomes ready to be reset and re-closed manually. As a result, there is danger that inadvertent re-closing of the circuit breaker allows the overcurrent flow to take place repetitively and that this in turn overheats electric wires to cause a burning accident in the worst case. In addition, a so-called hot start function method is proposed as a measure to prevent the burning accident. That is, the hot start function is such that the heat radiation characteristic of an electric wire is calculated on a simulation basis by a delay time circuit within an overcurrent trip device after trip operation. However, even using this method, the circuit breaker becomes ready to be reset and re-closed immediately after the trip operation, which again could not avoid danger of re-conduction with the temperature of the wire increasing close to the permissible value.

In contradistinction thereto, the external power supply type is characterized in that the aforementioned problem is not addressed and that the trip relay operation is held for a predetermined time after trip operation so that there is no danger of re-closing the electric circuit immediately after the trip operation as long as the external power supply is maintained. However, should the external power supply be lost, similar problems are encountered.

SUMMARY OF THE INVENTION

The present invention has been made in view of the above, and therefore an object of the present invention is to prevent burning of wires due to the re-closing of electric circuit immediately after an overcurrent trip device has been operated.

To achieve the above object, the present invention is applied to an overcurrent trip device that monitors the magnitude of a current flowing through an electric circuit at all times and drives a trip means after a predetermined delay time has elapsed upon judgment of an overcurrent, and the overcurrent trip device includes: an electric charge storage means for storing power for not only driving the trip means but also holding the operation of the trip means for a predetermined time; and a charging current generating means for outputting a charge current to the electric charge storage means so that the electric charge storage means completes storage of electric charges between occurrence of the overcurrent and the elapse of the delay time.

As a result of the aforementioned means, even if the supply of power to the power supply circuit of the overcurrent trip device is stopped after trip operation, the operation of the trip means can be held for a predetermined time by the power stored in the electric charge storage means. Therefore, re-closing of the electric circuit can be avoided during that time. The charging current generating means starts charging the electric charge storage means upon detection of an overcurrent and completes the charging operation before the trip means is driven.

With respect to the aforementioned delay time, there are three operation characteristics of the overcurrent trip device in relation to the magnitude of an input current and operation time: independent time lag characteristics, inverse time lag characteristics, and dependent time lag characteristics. It is supposed that the charging current generating means outputs a charging current corresponding to the magnitude of an overcurrent so as to match these operation characteristics. For example, in the case of the inverse time lag characteristics, the electric charge storage means is charged, e.g., at a charging current proportional to the magnitude of an overcurrent so that the larger the overcurrent is, the shorter the charging completion time becomes.

When an overcurrent trip device having a trip electromagnet as a trip means is incorporated into a circuit breaker, the trip electromagnet is driven by the power from the electric charge storage means upon occurrence of an overcurrent, which in turn trips the switch mechanism to thereby open the electric circuit. Further, after the opening of the electric circuit, the operation of the trip electromagnet is held for a predetermined time until the power from the electric charge storage means is lost, and therefore, the circuit breaker is not allowed to be reset and re-closed during that time.

Moreover, in the case of the overcurrent trip device having a trip relay as a trip means, the output of the trip relay is applied to the operation circuit of a switch, e.g., an electromagnetic contactor that breaks and makes an electric circuit, so that the switch is opened by driving the trip relay with the electric charge storage means, and the electric circuit is held opened until the electric charges of the electric charge storage means are lost. On the other hand, the electric circuit can be automatically re-closed by resetting the trip relay when the electric charges of the electric charge storage means have been lost. In this case, unless the overcurrent is eliminated, the electric circuit is opened again and re-closed, and this operation is repeated at a predetermined cycle until the overcurrent is eliminated. As a result, automatic continuous operation (auto-reset) is allowed to be implemented after the overcurrent operation.

The above and other objects and features of the present invention will be more apparent from the following description taken in conjunction with the accompanying drawings.

DETAILED DESCRIPTION OF THE PREFERRED EMBODIMENTS

Figure 1:
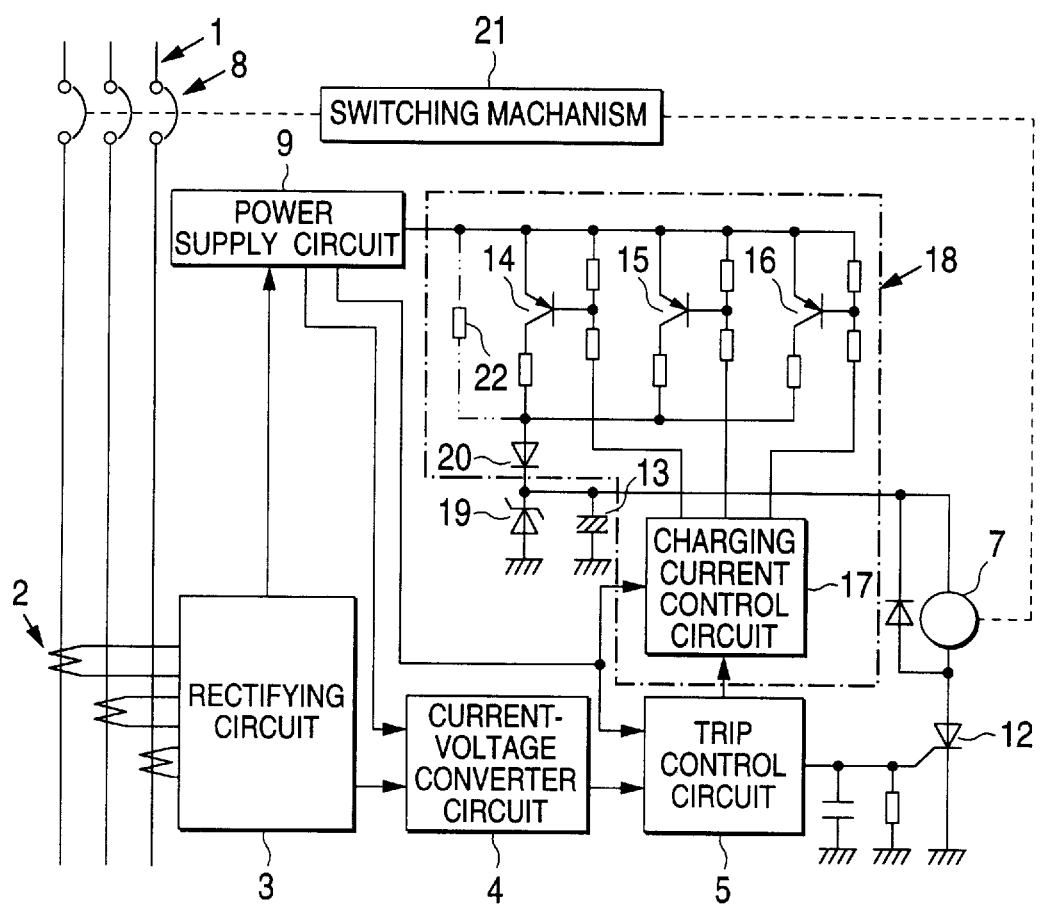
FIG. 1 is a block diagram showing an overcurrent trip device according to an embodiment of the present invention.

Embodiment of the present invention will now be described with reference to FIGS. 1 and 2. It may be noted that parts and components corresponding to those of the conventional example will be denoted as the same reference numerals. First, FIG. 1 is a block diagram showing an overcurrent trip device of current transformer power supply type having inverse time lag characteristics according to an embodiment of the invention. The overcurrent trip device shown in FIG. 1 is similar to the conventional example shown in FIG. 3. That is, a power supply circuit 9 is supplied with power from a rectifying circuit 3 and a current-voltage converter circuit 4 and a trip control circuit 5 are supplied with power from the power supply circuit 9. The overcurrent trip device is, however, distinguished from the conventional example in that a trip electromagnet 7 is driven by electric charges stored in a capacitor 13 serving as an electric charge storage means through a thyristor 12 serving as a trigger means.

The capacitor 13 is charged by a charging current from a charging current generating means 18 that consists of a plurality of transistors 14 to 16 (three in the shown embodiment) connected in parallel to the power supply circuit 9 and a charging current control circuit 17 that controls the turning on and off of the transistors. A constant voltage diode 19 that regulates an applied voltage is connected to the capacitor 13 in parallel, and a diode 20 that blocks reverse flow of current from the capacitor 13 at the time the voltage of the power supply circuit 9 drops is connected to the capacitor 13 in series.

In the device shown in the drawing, the charging current control circuit 17 normally blocks flow of current from resistor circuits that are connected to the bases of the transistors 14 to 16. Therefore, the absence of the base voltages to the transistors 14 to 16 leaves the transistors 14 to 16 turned off, and the capacitor 13 is hence disconnected from the power supply circuit 9. If it is assumed that an overcurrent has occurred along the electric circuit 1, the trip control circuit 5 applies an overcurrent generation signal corresponding to the overcurrent to the charging current control circuit 17. As a result, the charging current control circuit 17 turns on only one, or two, or all the three transistors out of the transistors 14 to 16 sequentially, e.g., from the left side onward in accordance with the magnitude of the overcurrent. Hence, the charging current flows into the capacitor 13 from the power supply circuit 9 through the transistors 14 to 16 and the diode 20, allowing the capacitor to be charged. At this time, the larger the magnitude of the overcurrent, the larger the number of the transistors 14 to 16 that turn on, thus increasing the charging current as well as reducing the charging completion time. Further, the charging completion time is set to a value shorter than a time (delay time) from a timing at which the trip control circuit 5 detects an overcurrent to a timing at which the trip control circuit 5 outputs a trip signal.

On the other hand, when a delay time corresponding to the overcurrent elapses after the overcurrent has occurred, the trip control circuit 5 applies a trip signal to the gate circuit of the thyristor 12. As a result, the thyristor 12 turns on, which in turn causes the capacitor 13 that has been charged completely by that time to drive the trip electromagnet 7. The trip electromagnet 7 acts on a switch mechanism 21 through a not shown actuator, unlatches the switch mechanism 21 to thereby open a circuit breaker 8. When the electric circuit 1 has been opened, the supply of power to the power supply circuit 9 is stopped, but in the meantime, the trip electromagnet 7 remains held operational for a predetermined time, e.g., for a minute or so, until the electric charges stored in the capacitor 13 are lost. The switch mechanism 21 cannot be reset while the trip electromagnet 7 is in operation, which in turn makes it impossible also to re-close the circuit breaker. It may be noted that in FIG. 1, a shorting circuit having a resistor 22 whose resistance is large can be inserted in parallel to the transistors 14 to 16 as indicated by the chain line to charge the capacitor 13 on a reserve basis at all times in order to increase the electric charges stored in the capacitor 13 without increasing the charging completion time.

Figure 2:
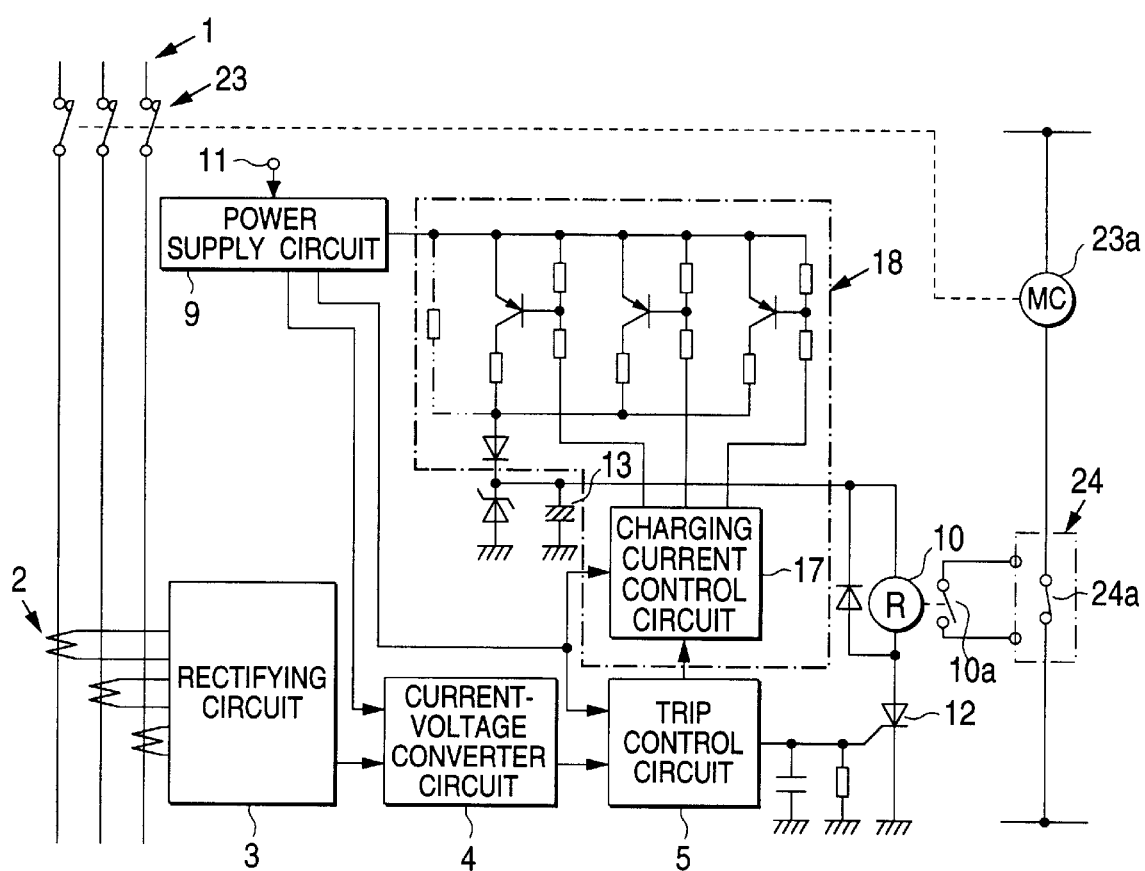
FIG. 2 is a block diagram showing an overcurrent trip device according to another embodiment of the present invention.
Figure 3:
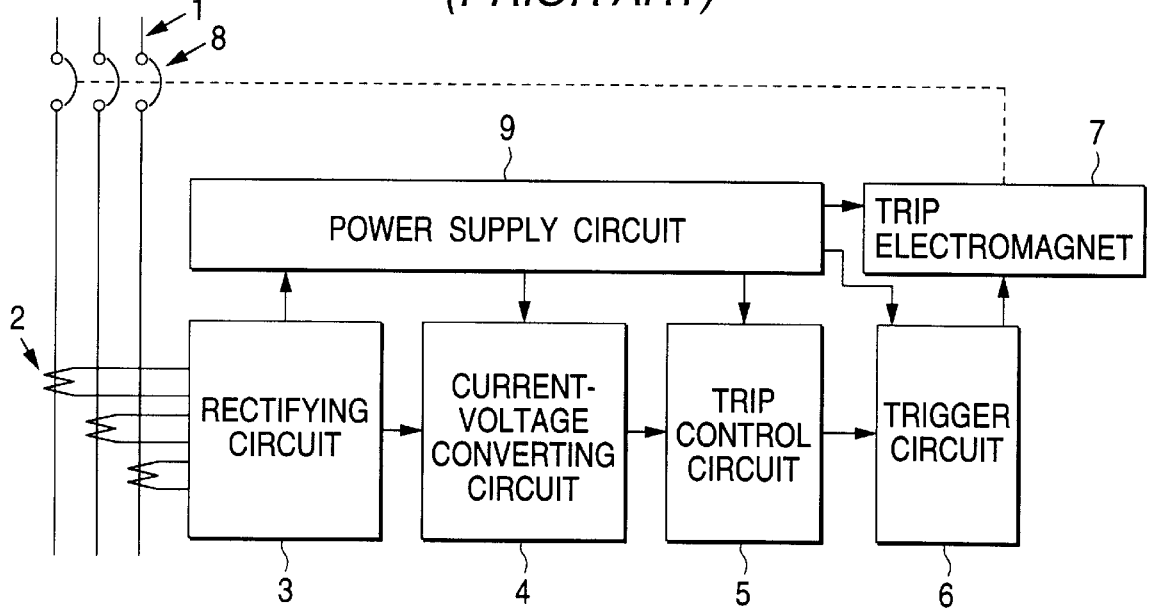
FIG. 3 is a block diagram showing a conventional overcurrent trip device of current transformer power supply type.
Figure 4:
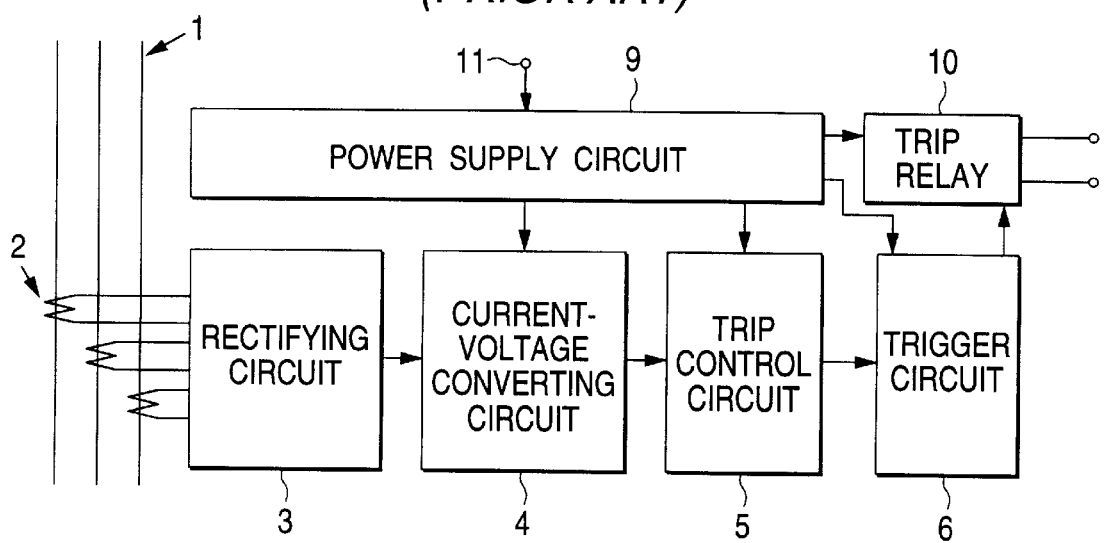
FIG. 4 is a block diagram showing a conventional overcurrent trip device of external power supply type.

FIG. 2 is a block diagram showing an overcurrent trip device of external power supply type according to another embodiment of the invention. In FIG. 2, what is distinguished from the embodiment shown in FIG. 1 is that the power supply circuit 9 receives power from a not shown external power supply through an external input terminal 11 and that the trip relay 10 is driven by power from the capacitor 13 while an overcurrent is occurring. Here, the output of the trip relay 10 is applied to the operation circuit 24 of an electromagnetic contactor 23. When the trip relay 10 operates, i.e., when the contact 10a of the trip relay 10 turns on, the contact 24a within the operation circuit 24 turns off, which in turn releases the electromagnetic contactor 23 with the operation coil 23a thereof nonenergized. On the one hand, when the contact 10a turns off, the contact 24a turns on, which in turn re-closes the electromagnetic contactor 23 by energizing the operation coil 23a thereof.

If it is assumed that an overcurrent has occurred along the electric circuit 1, the trip relay 10 is driven after a predetermined delay time has elapsed as described in the embodiment shown in FIG. 1, and therefore the contact 10a turns on. As a result, the electromagnetic contactor 23 is released and remains held released until the electric charges of the capacitor 13 are lost, e.g., for a minute or so as described above. When the electric charges of the capacitor 13 have thereafter been lost, the trip relay 10 resets to turn off the contact 10a, and the contact 24a turns on to re-close the electromagnetic contactor 23. In this case, if the overcurrent is not eliminated at this point, the overcurrent trip device operates again to thereby release the electromagnetic contactor 23 and re-close the electromagnetic contactor 23 after a predetermined time. That is, in the embodiment shown in FIG. 2, after the electric circuit 1 has been opened, it is attempted to close the electric circuit 1 again at a predetermined cycle, and when the overcurrent has been eliminated, load operation is automatically resumed.

While overcurrent trip devices having inverse time lag characteristics have been presented in the aforementioned embodiment, the present invention is also applicable to overcurrent trip devices having independent time lag characteristics or dependent time lag characteristics. Further, the trip means is not limited to a trip electromagnet or a trip relay, and the output of the trip relay can be applied not only to an electromagnetic contactor, but also to the electromagnetic trip device or remote operating device of a circuit breaker as well as to the drive circuit of an alarm buzzer.

As described in the foregoing, according to the present invention, even after the supply of power to the power supply circuit has been stopped, the trip means can be held operational by the electric charge storage means for a predetermined time. Therefore, occurrence of accidents such as burning of wires due to repetitive re-closing of the electric circuit immediately after trip operation can be effectively prevented. In addition, in the present invention, the trip relay is used as a trip means, and this trip relay opens a circuit breaker that breaks and makes an electric circuit when the trip relay is in operation and closes the circuit breaker when the trip relay is not in operation. As a result of this construction, an attempt is made to re-close the electric circuit at a predetermined cycle until the overcurrent is eliminated after the trip operation, and load operation can be resumed automatically after the overcurrent has been eliminated.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An overcurrent trip device that monitors a magnitude of a current flow through an electric circuit at all times and drives a trip means after a predetermined delay time has elapsed upon judgment of an overcurrent, said device comprising:

electric charge storage means for driving the trip means and storing power to hold the operation of the trip means for a predetermined time; and charging current generating means for outputting a charge current to the electric charge storage means so that said electric charge storage means completes storage of electric charges between occurrence of the overcurrent and the elapse of the delay time, wherein said charging current generating means includes a plurality of transistors coupled to the electric charge storage means and connected to conduct the charge current in parallel.

2. An overcurrent trip device according to claim 1, further comprising a trip electromagnet that is incorporated into a circuit breaker of the electric circuit and that trips a switch mechanism of the circuit breaker, the trip electromagnet serving as the trip means.

3. An overcurrent trip device according to claim 1, wherein said trip means comprises a trip relay that gives an output to an operating circuit of a circuit breaker of an electric circuit;

wherein said trip relay opens the circuit breaker when the trip relay is in operation and closes the circuit breaker when the trip relay is not in operation.

4. An overcurrent trip device according to claim 1 wherein said electric charge storage means includes:

a charging capacitor; and a diode connected in parallel with said charging capacitor to regulate an applied voltage received by said charging capacitor.

5. An overcurrent trip device according to claim 4, wherein the charging capacitor is coupled to a thyristor.

6. An overcurrent trip device according to claim 1, wherein said charging current generating means further includes:

a charging current control circuit connected to said plurality of transistor circuits and supplying the charging current to said plurality of transistors.

7. An overcurrent trip device according to claim 6, wherein said plurality of transistors are connected in parallel, and wherein said device further includes:

a trip control circuit connected to said charging current control circuit and supplying an overcurrent generation signal, and wherein said overcurrent generation signal causes said charging current control circuit to sequentially activate each of said transistors.

8. An overcurrent trip device according to claim 7, wherein a number of said transistors activated by said charging current control circuit depends on the magnitude of overcurrent.

9. An overcurrent trip device that monitors a magnitude of a current flow through an electric circuit at all times and drives a trip means after a predetermined delay time has elapsed upon an a judgement of overcurrent occurrence, said device comprising:

electric charge storage circuit driving the trip means and storing power to hold the operation of the trip means for a predetermined time; and a plurality of transistor circuits outputting a charge current to the electric charge storage circuit so that said electric charge storage circuit completes storage of electric charges between the overcurrent occurrence and the elapse of the delay time; and a trip control circuit coupled to a charging current control circuit and supplying an overcurrent generation signal indicating a start of the overcurrent occurrence.

10. An overcurrent trip device according to claim 9, wherein said plurality of transistor circuits are connected in parallel, the device further comprising:

a charging current control circuit connected to the trip control circuit and the plurality of transistor circuits, wherein said overcurrent generation signal causes said charging current control circuit to sequentially activate each of said transistor circuits.

11. An overcurrent trip device according to claim 10, wherein a number of said transistor circuits activated by said charging current control circuit depends on a magnitude of overcurrent.

12. An overcurrent trip device according to claim 9, wherein said electric charge storage circuit includes:

a charging capacitor; and a diode connected in parallel with said charging capacitor to regulate an applied voltage received by said charging capacitor.

* * * * *

UNITED STATES PATENT AND TRADEMARK OFFICE
CERTIFICATE OF CORRECTION

PATENT NO. : 5,825,602
DATED : October 20, 1998
INVENTOR(S) : TOSAKA et al.:

It is certified that error appears in the above-identified patent and that said Letters Patent is hereby corrected as shown below:

Claim 9, column 6, line 34, after "upon", delete "an".

Signed and Sealed this

Twenty-first Day of March, 2000

Attest:

Attesting Officer

Q. TODD DICKINSON

Commissioner of Patents and Trademarks